United States Patent [19]
Deal, Jr.

[11] 4,287,577
[45] Sep. 1, 1981

[54] INTERLEAVED TDMA TERRESTRIAL INTERFACE BUFFER

[75] Inventor: Joseph H. Deal, Jr., Clarksburg, Md.

[73] Assignee: Communications Satellite Corporation, Washington, D.C.

[21] Appl. No.: 79,681

[22] Filed: Sep. 27, 1979

[51] Int. Cl.³ .............................................. G11C 8/00
[52] U.S. Cl. .................................................. 365/233
[58] Field of Search ........................ 365/189, 230, 233

[56] References Cited

U.S. PATENT DOCUMENTS

| | | | |
|---|---|---|---|
| 3,962,689 | 6/1976 | Brunson | 365/233 |
| 4,141,039 | 2/1979 | Yamamoto | 365/230 |

FOREIGN PATENT DOCUMENTS

603136  3/1978  U.S.S.R. .................................. 365/233

Primary Examiner—Stuart N. Hecker
Attorney, Agent, or Firm—Sughrue, Rothwell, Mion, Zinn and Macpeak

[57] ABSTRACT

A common memory is used for asynchronous interleaved read and write operations. TDMA data compression and expansion is performed without ping-pong memories and elastic buffering is also possible. A buffer reset method is used to automatically slip a fixed number of bits in response to excessive phase shift between the read and write clock.

19 Claims, 11 Drawing Figures

INTERLEAVED TDMA TERRESTRIAL INTERFACE BUFFER

BACKGROUND OF THE INVENTION

In conventional Time Division Multiple Access (TDMA) systems, compression and expansion buffering is accomplished by using two separate memories in a ping-pong arrangement. With such an arrangement, one memory is continuously read while the other is continuously written and the two memories are alternately switched between read and write states on a TDMA frame boundary, thus avoiding the problems of asynchronously reading and writing the same memory. A disadvantage inherent in the use of ping-pong memories, however, is that it requires two buffer memories, each of which is at least large enough to accomodate a TDMA frame. This can proove particularly costly in long-frame TDMA systems in which large buffers are required.

A second disadvantage of the ping-pong memory configuration is that, due to the rigid timing requirements of alternately switching from one memory to the other, elastic buffers, which compensate for satellite motion and oscillator drift, cannot be incorporated as part of the TDMA compression/expansion buffers. It is thus necessary to construct the elastic buffer or alternate pulse stuffing units separately when using the ping-pong method.

SUMMARY OF THE INVENTION

It is an object of this invention to eliminate the necessity of ping-pong buffer memory configurations for performing TDMA compression and expansion buffering.

It is a further object of this invention to provide a memory configuration capable of both compression and expansion and elastic buffering.

Briefly, these and other objects are achieved according to the present invention by using a single Random Access Memory (RAM) for interleaved read and write operations. The terrestrial clock is used to trigger the read/write cycle for transfering data into or out of the RAM, but the actual timing control of the transfer to or from the RAM is synchronized with the bus clock. Triple buffering of the frame data is provided to permit time hopping, and a buffer address counter reset technique is used to automatically "slip" the read or write clocks in response to excessive phase shift between the read and write clocks.

BRIEF DESCRIPTION OF THE DRAWINGS

These and other objects will be more clearly understood with reference to the following description in conjunction with the accompanying drawings in which.

DETAILED DESCRIPTION OF THE INVENTION

A more complete understanding of the operation of the overall TDMA system of which the present invention forms a part can be obtained by reference to copending applications entitled Microprogrammable TDMA Terminal Controller, TIM Bus Structure, and TDM Data Reorganization Apparatus, identified by Ser. Nos. 79,619, 79,602, and 79,601, respectively, and filed concurrently herewith, and these related applications are incorporated herein by reference.

Figure 1:
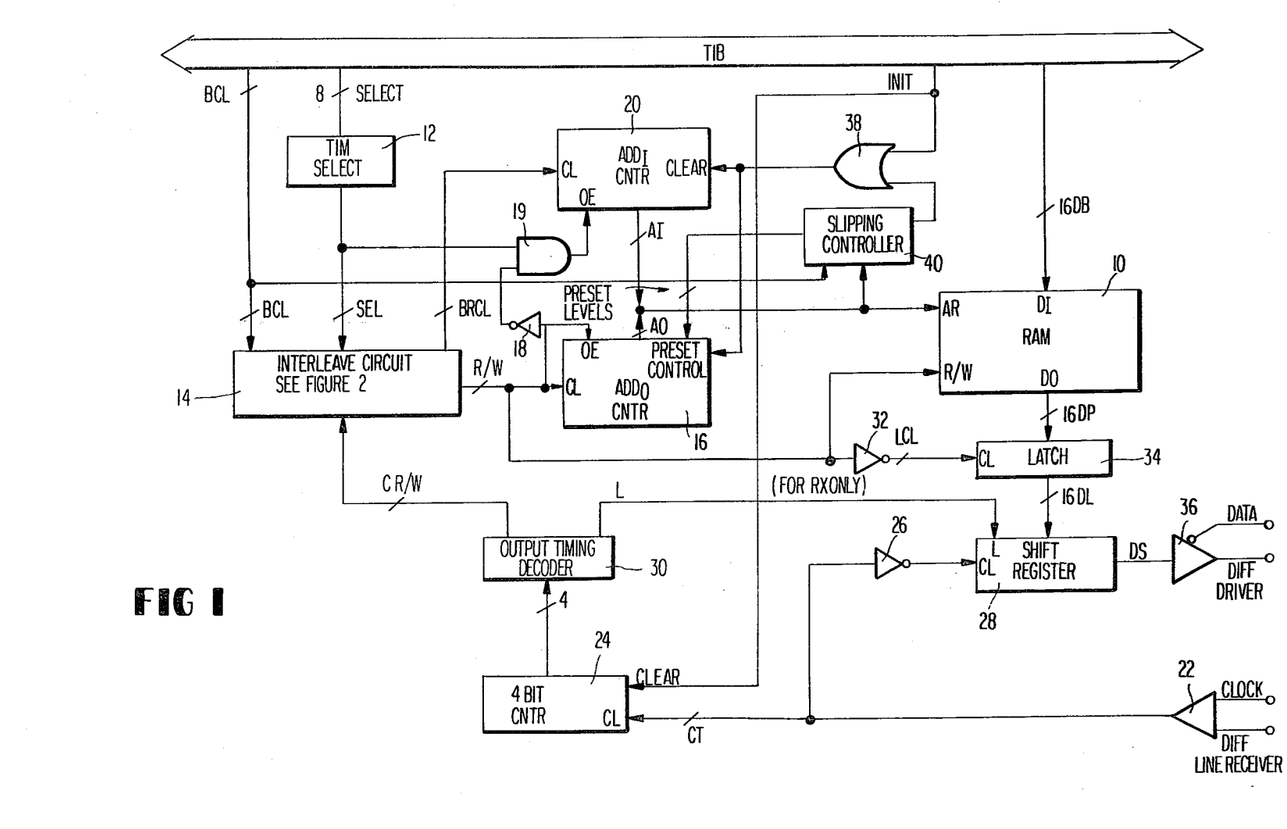
FIG. 1 is a block diagram of the overall Terrestrial Interface Module (TIM) receive buffer.

Turning now to FIG. 1, a block diagram illustrating the TIM combined receive buffer operation is shown. For the purposes of this description, the interleaved buffer according to the present invention is assumed to be interconnected to the TDMA common equipment (CTE) via a terrestrial interface bus (TIB) where the TIB incorporates 16 data lines and 8 select lines used for multiplexing separate interleave buffers. The interleaved buffer circuitry includes a Random Access Memory (RAM) 10 having a data input terminal which receives 16 parallel data bits from the TIB. The memory further includes an address terminal for specifying the read or write addresses, a read/write (R/W) terminal for controlling the read and write operations, and a data output terminal for providing 16 parallel data bits from a specified address in response to a read signal. The receive buffer circuitry further includes a TIM select circuit 12 which provides a select (SEL) output signal in response to the detection of the address of the particular TIM. This SEL signal is received by an interleave circuit 14 which also receives a bus clock signal (BCL).

The interleave circuit 14 logically combines the BCL and SEL signals to provide a burst clock (BRCL) signal which serves as the clock input to increment the write input address counter 20.

A terrestrial clock signal CT is received from amplifier 22 as the clock input to a 4-bit counter 24 and through inverter 26 as the clock input to a shift register 28. The output timing decoder 30 receives the output from the 4-bit counter 24 and provides a read/write control signal CR/W every 16 periods of the terrestrial clock CT. The output timing decoder 30 also provides a shift register load signal L at some time between each of the CR/W signals.

The interleave circuit 14, with the aid of the CR/W signal, provides a read/write signal R/W which occurs once every during every 16 periods of the terrestrial clock CT but is also synchronized to the bus clock BCL. This R/W signal is used as the clock input to the output address counter 16, as the read/write signal to the memory 10 and as the output enable signal to the counter 16. It is also supplied through the inverter 32 to the clock input of latch 34 and through the inverter 18 to one input of AND gate 19, the output of which enables the counter 20. The other input to gate 20 is provided by the output of select circuit 12. With this arrangement, the output at counter 20 will be enabled at all times during the select period when the write, or R/W low, signal is present, the counter 20 being continuously incremented by BRCL to store successive data blocks at successive addresses, and the data at a specified output address will be provided to the data output terminals of the memory 10 in response to a high level in the R/W signal. The following low level in the R/W will result in this output data being stored in latch 34. At some time prior to the next read signal, a load signal L will be provided to the shift register 28 to cause the shift register 28 to store the 16 parallel bits from the latch 34. The terrestrial clock CT will then cause these 16 bits to be sequentially read out in the form of a serial data stream DS to the amplifier 36.

The receive buffer circuitry also includes an OR gate 38 which clears the input address counter 20 and presets the output address counter 16 in response to either an initialization signal received from the TIB or an output signal from the slipping controller circuit 40 indicating that an excessive phase shift between the read and write signals has occurred.

Due to the parallel structure and operation of the transmit and receive buffers, only the receive buffer is shown and described herein. With the exception of the shift register load signal L, only the data path elements are affected by specializing the buffer for transmit or receive interfaces, and these will operate in substantially the reverse direction.

Figure 2:
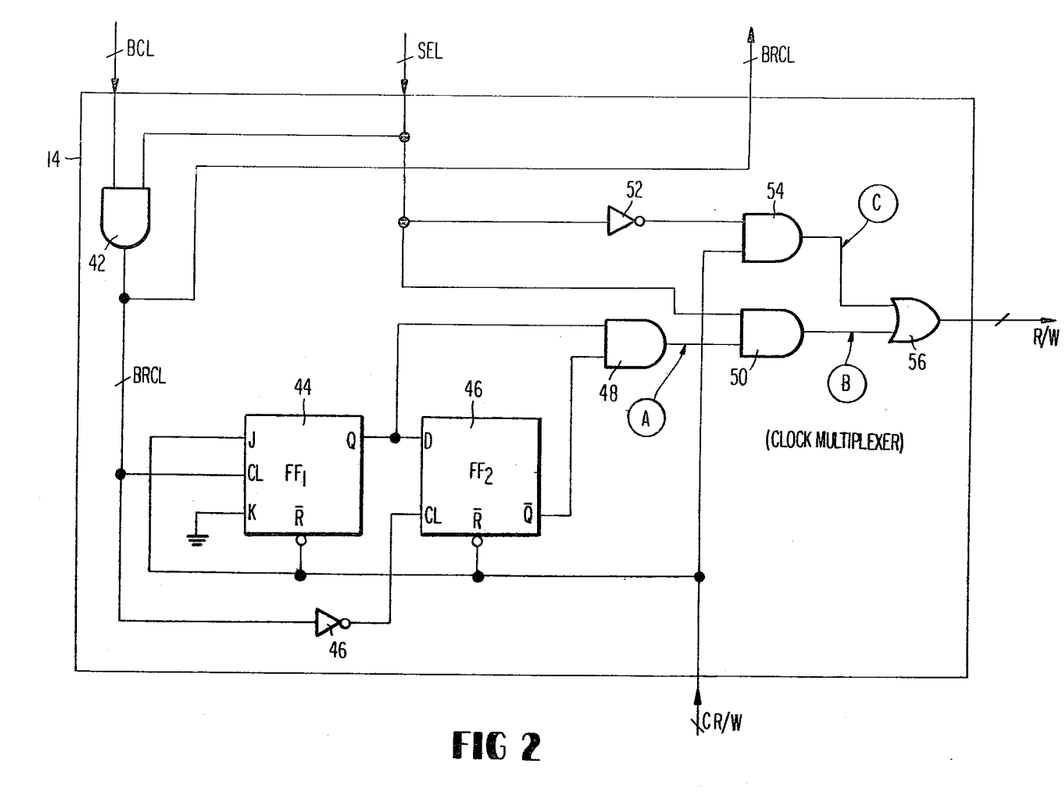
FIG. 2 is a block diagram of the interleave circuit shown in FIG. 1.

FIG. 2 is a logic diagram of the interleave circuit 14 shown in FIG. 1. An AND gate 42 receives both the BCL and SEL signals and provides at its output the burst clock BRCL. This is used as the clock signal to JK flip-flop 44 and through an inverter 46 as the clock signal to a D-type flip-flop 46. The Q and Q outputs of the flip-flops 44 and 46, respectively, are combined in AND gate 48, the output of which is received as one input by AND gate 50. The SEL signal is provided as the other input to the AND gate 50 and, through inverter 52, to one input of AND gate 54. The second input to gate 54 as well as the J input to flip-flop 44 and the reset input to both flip-flops is provided by the read/write control signal CR/W. Finally, the outputs of gates 50 and 54 are combined in an OR gate 56, the output of which is the R/W signal.

Figure 3:
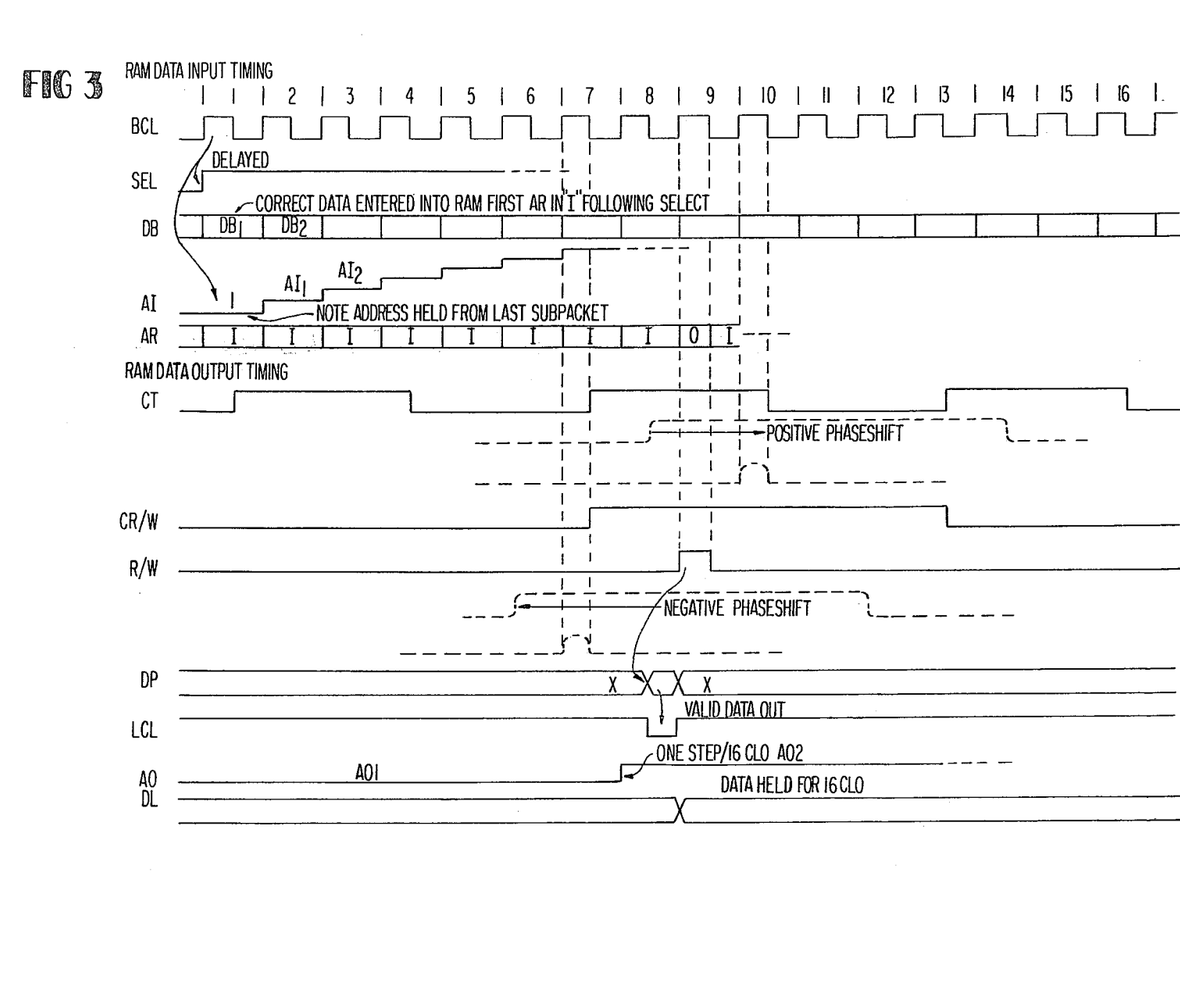
FIG. 3 is an illustration of the data input and output timing for the RAM of FIG. 1.

FIG. 3 is a timing diagram helpful in understanding the operation of the circuitry shown in FIGS. 1 and 2. An important feature to be noted in the operation of the interleaved buffer is that the RAM read/write cycles are actually synchronized with the bus clock and consequently the bus data. Thus, although a pulse derived from the terrestrial clock is used to trigger a RAM read cycle and the data in the shift register 28 is serially read out by the terrestrial clock, the actual transfer from the RAM to the latch is accomplished in response to the R/W signal which is synchronized to the bus clock.

In FIG. 3, a continuous bus clock is shown. The interleave circuit 14 will receive the bus clock signal and, in response to the detection of the proper address, will also receive the SEL signal from TIM select circuit 12. This will result in a burst clock signal BRCL identical to the bus clock BCL shown in FIG. 3, which signal will clock the write address counter 20. Each cycle of the burst clock will increment the counter 20 the output of which is continuously enabled during the low level R/W signal. The high level R/W signal increments the counter 16 and enables the output thereat to supply a read address to the RAM 10. These counters will have been cleared and preset, respectively, by an initialization signal passed through the OR gate 38. This initialization pulse is received only by that TIM which has been selected. Thus, for the duration of the selected period, the memory will store the input data at the successive input addresses specified when the output of the counter 20 is enabled by the low R/W signal. The memory will continue to store data at the successively supplied input addresses with the first data block $DB_1$ being stored at the first input address, the second data block $DB_2$ being stored at the second address, etc. At some time which occurs once during every 16 periods of the terrestrial clock, a CR/W signal will be provided by the output timing decoder 30 to the interleave circuit 14. Due to the inverter 52, the gate 54 will be disabled during the select period, but the CR/W signal will reset the flip-flops 44 and 46. Since the flip-flop 44 is clocked directly by the burst clock BRCL and the flip-flop 46 is clocked by the BRCL signal through an inverter 46, there will subsequently occur at the output of gate 48 a narrow (half bus clock period) high level pulse which is synchronized with the bus clock (BCL high) half-period. At this time, the output of the address counter 16 will be enabled and the memory will provide at its output the data at the address specified by counter 16. At the next low level in the R/W signal, the data will be stored in the latch 34, later loaded into the shift register and then serially read out by the terrestrial clock CT. The effects of phase shifts between the CR/W and BCL are illustrated by the dotted timing relationships in FIG. 3, and it should be noted that despite some relative phase shift, the read pulse will always be synchronized with the high level BCL half-period.

Figure 4:
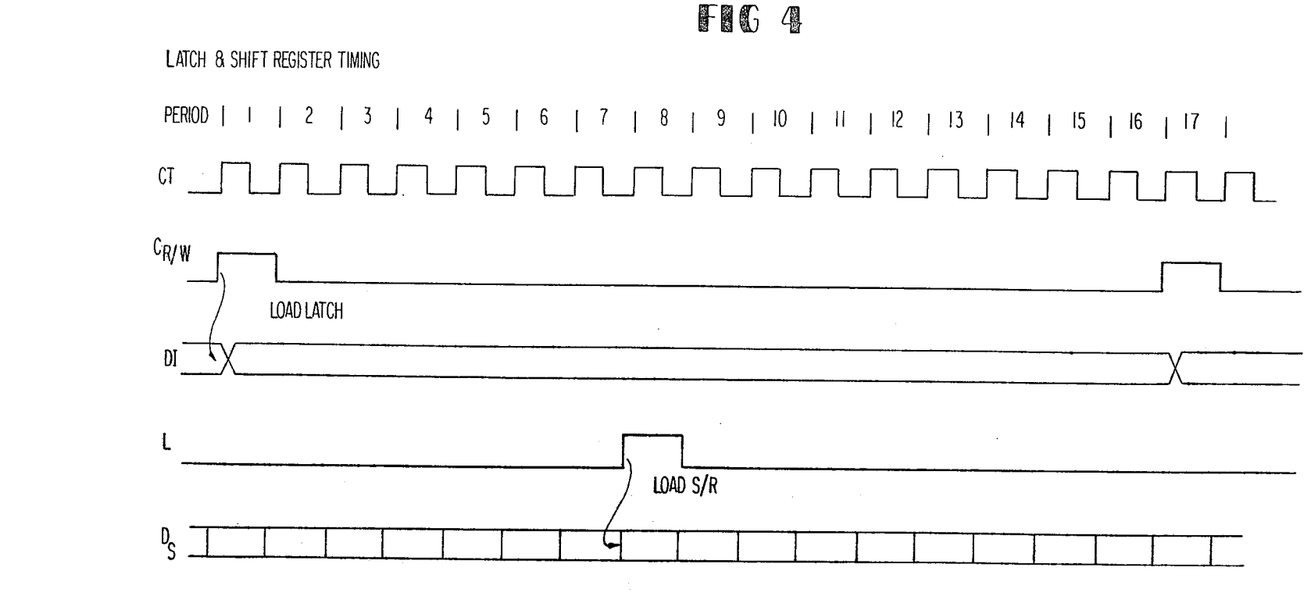
FIG. 4 is an illustration of the operation timing of the latch and shift register shown in FIG. 1.

The operation timing of the latch and shift register are shown on an expanded time schedule in FIG. 4. Note that the CR/W occurs once during every sixteen terrestrial clock periods with data being read from the latch 34 into the shift register 28 by the signal CL at some point between the CR/W pulses. This arrangement avoids problems associated with simultaneously reading the RAM and loading the shift register.

Referring again to FIG. 3, it should be noted that, although the RAM address input is continuously switched between input and output cycles the input address AI is not advanced and the data are not actually stored in that RAM location until a select pulse occurs. During a selected period, TIM interleave RAM read/write operations take place with both the input and output address counters 20 and 16, respectively, advancing. The last address of the select period is not written until the first address of the next period.

Figure 5:
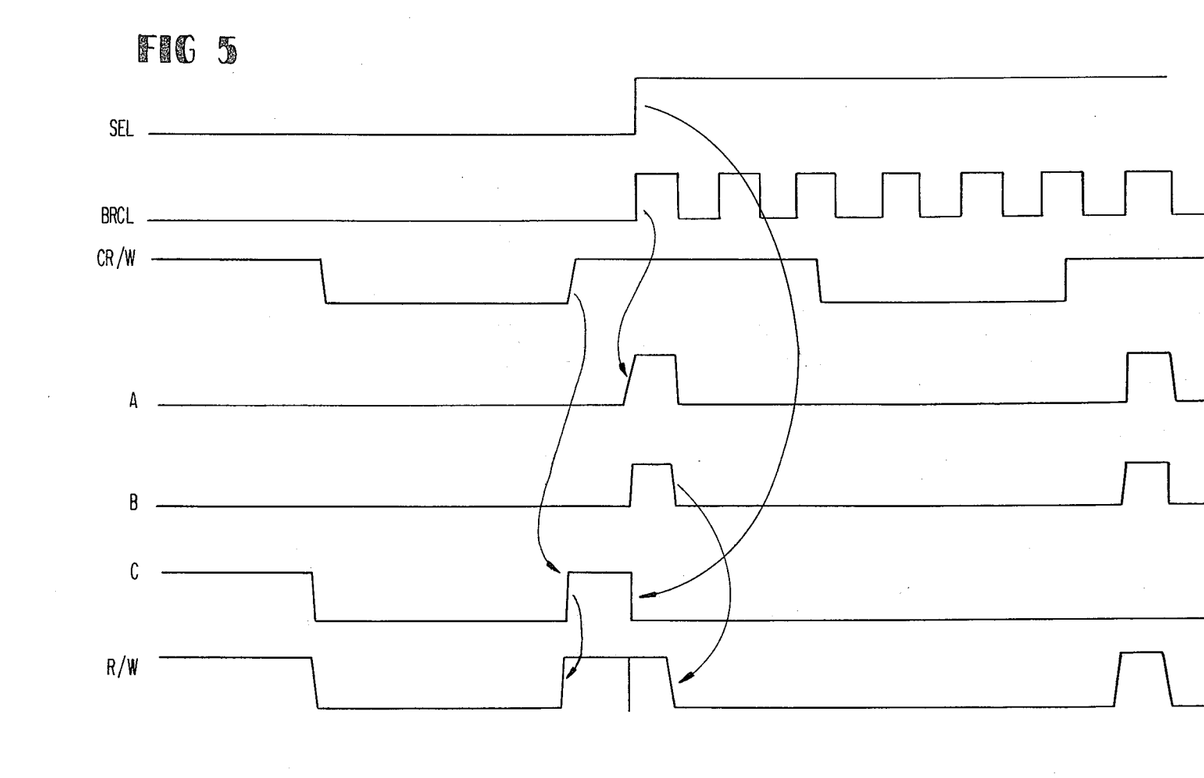
FIGS. 5 and 6 are expanded timing diagrams of the interleave circuit operation during TIM select and TIM deselect, respectively.
Figure 6:
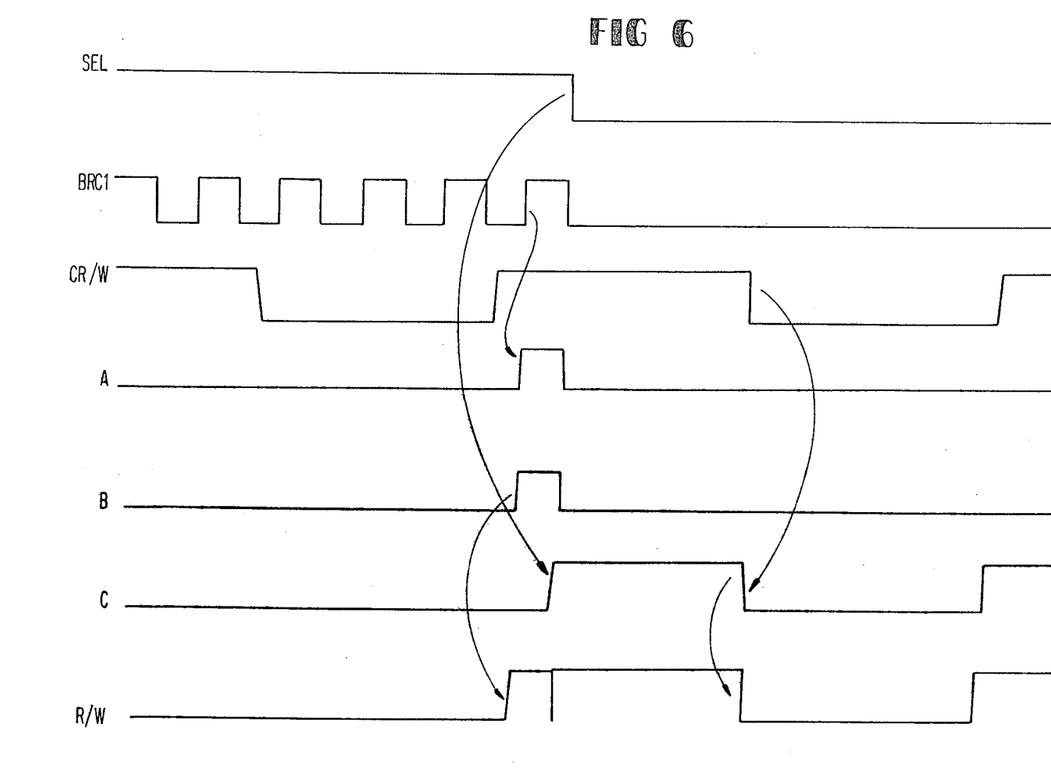

Further timing details concerning the buffer interleave control are shown in FIGS. 5 and 6. FIG. 5 shows the interleave buffer being selected and the burst clock BRCL initiated at the beginning of a data subpacket. Waveforms A, B and C represent the output of the terrestrial clock multiplexer, burst clock retiming circuit for interleaved read/write during subpacket reception, and burst clock multiplexer output, respectively, and are derived from the points designated within the interleave circuit 14 in FIG. 2. An important characteristic shown in FIG. 5 is the smooth transition from the R/W derived directly from the terrestrial clock through the gate 54 to the terrestrial clock retimed by the BRCL at the beginning of the SEL signal. Note that short clock pulses which could cause a RAM read or write malfunction do not occur. Note further that the possibility of an anomalous pulse occuring during the transition between waveforms B and C can easily be completely avoided using proper logic design techniques well known in the art.

FIG. 6 illustrates the condition at the end of a subpacket where the buffer is deselected. In this case the R/W signal undergoes a transition from narrow pulses (half burst clock period) to the terrestrial clock. As shown in FIG. 6, this transition is accomplished without missed or false clock pulses.

Figure 7:
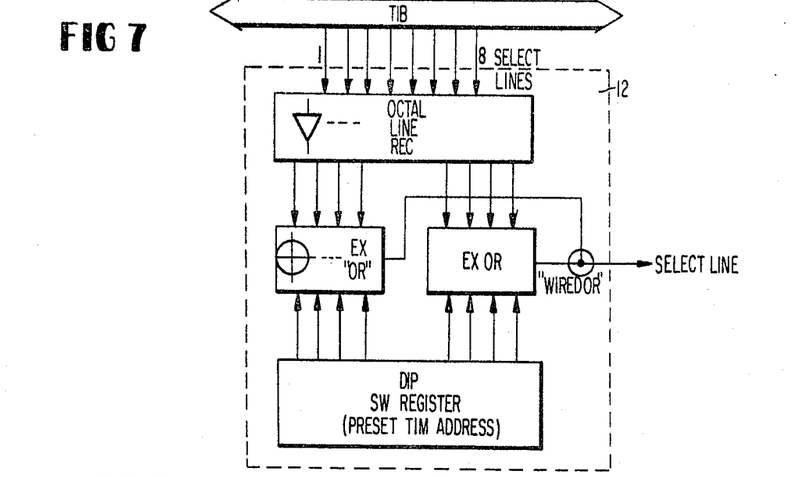
FIG. 7 is a block diagram of the TIM select circuitry of FIG. 1.

FIG. 7 is a brief block diagram of the TIM select circuitry 12 of FIG. 1. The user sets the desired address for the specific TIM using a set of switches located on the TIM card. This TIM select circuitry could be replaced with any one of a variety of well-known address detection circuits.

A number of different memory configurations could be used depending on the data rate, frame length, cost objectives and a variety of other factors. Possible RAM configurations for a 24 ms TDMA frame are listed in Table I for various data rates based on the requirement for full triple buffering of the frame data for time-hopping, and additional buffering (4 ms) to accomodate slipping, i.e., repeating or deleting, data channels on 2 ms boundaries. In order to provide the time-hopping capability of reconfiguring active calls to new frame positions including beginning-to-end and end-to-beginning hops, it is necessary that the buffer be capable of handling three full frames of data.

TABLE I

COMBINED BUFFER REQUIREMENTS

| Bit Rate (kb/s) | Buffer Size (bits) | | No. of RAM for RAM Types+ | | | |
|---|---|---|---|---|---|---|
| | One Frame (+ 24 ms) | Three Frames (+ 40 ms) | 64 kbit* (8k × 8b) | 16 kbit** (9k × 8b) | 8 kbit (1k × 8b) | 4 kbit (1k × 4b) |
| 2048 | 49152 | 155648 | 4 | 10 | 20 | 40 |
| 1024 | 24576 | 77824 | 2 | 6 | 10 | 20 |
| 512 | 12288 | 38912 | 2 | 4 | 6 | 12 |
| 256 | 6144 | 19456 | 2 | 2 | 4 | 8 |
| 128 | 3072 | 9738 | 2 | 2 | 2 | 4 |
| 72 | 1728 | 5472 | 2 | 2 | 2 | 4 |
| 64 | 1536 | 4864 | 2 | 2 | 2 | 4 |
| 56 | 1344 | 4224 | 2 | 2 | 2 | 4 |
| 48 | 1152 | 3648 | 2 | 2 | 2 | 4 |
| 32 | 768 | 2432 | 2 | 2 | 2 | 4 |
| 2 | 48 | 152 | 2 | 2 | 2 | 4 |

+I/O multiplex ICs not counted
*Static RAMs not currently available (for fixture consideration)
**Static RAM with limited availability The minimum number of RAM ICs required in all cases is two, using 8-bit parallel RAMs to accomodate the 16-bit bus. A minimum of four 4-bit parallel RAMS is required to accomodate the 16-bit bus; however the 1K×4 bit RAMS are available with separate I/O which eliminates the I/O multiplexing required for the other cases.

Figure 8:
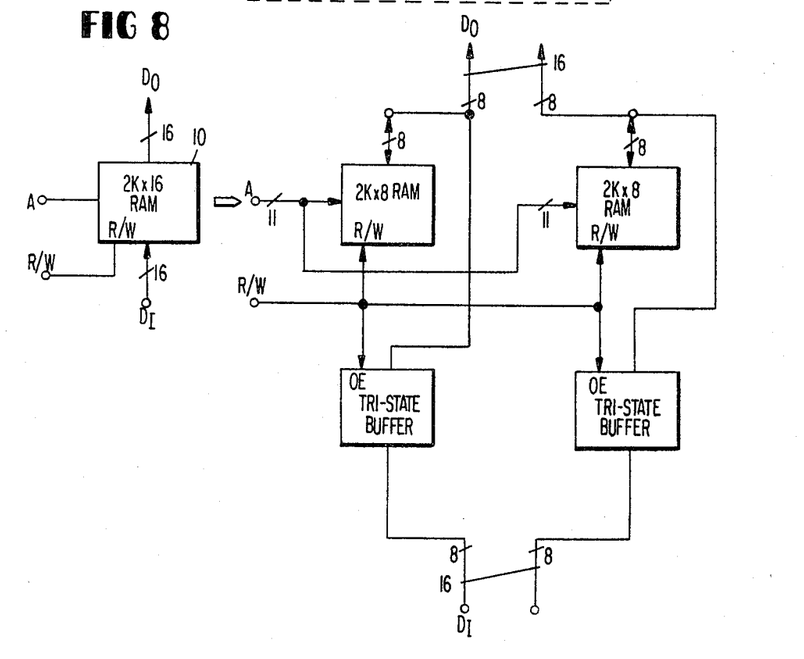
FIG. 8 is a block diagram of one possible configuration for the RAM of FIG. 1.

All of the 8-bit parallel RAMs listed have bidirectional data I/O lines, which complicate to some extent the TIM circuit design. Shown in FIG. 8 is a configuration for implementing a 2K×16 bit RAM using two 2K×8 bit RAMs and two tri-state buffers for a total of 4 ICs.

The most attractive approach fpr accomodating the range of data bit rates, 2–2048 kbit/s, based on IC cost availability and number of ICs, is to contruct two TIM types, a low bit rate TIM which accomodates up to 128-kbit/s channels using four 4-kbit RAMs and a high bit rate TIM which accomodates up to 2048 kbit/s channels using twenty 8-kbit RAMs. As an alternative, a non-time-hopping, high bit rate buffer could be constructed using eight 4-kbit RAMs, a reduction of over half. 64-kbit and 16-kbit RAMs will become attractive alternatives for high bit rate applications as soon as they become readily available. Other devices, including CCD and magnetic "bubble" shift register type memory devices could be used but these devices are generally too slow and too difficult to interface in the interleave buffer design.

Figure 9:
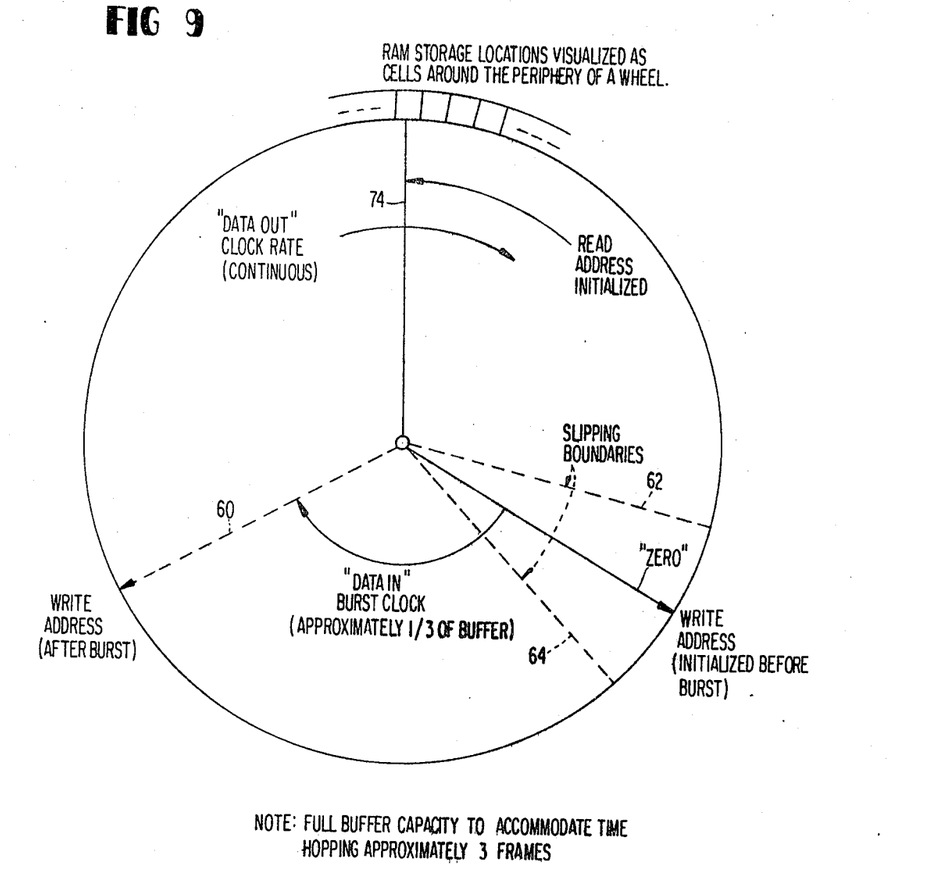
FIG. 9 is an explanatory diagram of the slipping control operation of the interleave buffer according to the present invention.

During initialization, the interleave buffer read and write addresses are set a maximum "distance" apart with distance being defined as the difference between the modulo M number of RAM addresses. This concept is illustrated in FIG. 9, which indicates the initialized positions of the read and write RAM address vectors. As RAM read/write operations proceed, these vectors rotate around the storage wheel at the output and input data rates.

Since a receive buffer is illustrated and described hereinabove, the initialization which occurs just prior to a burst positions the vectors one-third of the total distance apart. Following the burst, the vectors are still one-third of the total distance apart but the write address has advanced to the position shown by the dotted line 60 in FIG. 9, and the vectors are approaching from the opposite direction. Between receive bursts, the read address vector moves continuously in the clockwise direction until again just prior to a receive burst, the vectors are one-third of the total distance apart.

This type of operation solves the problem of providing continuity of data flow during TDMA time-hopping intervals. With this design, full time hops across the entire frame do not affect the flow of the terrestrial data. For example, at the instant prior to transmission, a frame management signalling message can reposition a data packet from the beginning of a frame to the end, a full frame hop excluding reference and request packets. To accomodate this without loss of data, the buffer must have sufficient capacity to accept an additional frame of data (a total of two frames) prior to bursting out data at the end of the frame. Alternatively, repositioning a packet from the end to the beginning of the frame immediately following a burst requires that a full second frame of data be available. Thus, the total required buffer capacity to accomodate frame hopping is three full frames.

Slipping boundaries are also shown by the dotted lines 62 and 64 in FIG. 9. These boundaries or equivalent margins are used to allow phase shifts to occur between the read and write clocks and equivalent address vectors. When this phase shift exceeds a prescribed value, the slipping control circuitry 40 resets the vector phase margin, repeats or deletes data, and the process continues.

One preferable technique for controlling phase slips for a TDMA system is to execute slipping on two ms boundaries. Using such a boundary, the maximum phase shift introduced by satellite motion over a 24-hour period (typically one ms) is accomodated without slipping. Further, the CEPT 32 digroup super frame is 2 ms, so that slipping on 2 ms frame boundaries is transparent. Still further, in view of the $2 \times 10^{-11}$ average 24-hour clock stability ($10^{-11}$ at each end), a 2 ms slip, with 1 ms allotted to satellite motion, can occur approximately every 1.7 years. This is based on the assumption that a whole frame (end-to-end) packet repositioning also occurs during the 1.7 year call duration. This last item suggests that the buffer slipping control could be eliminated except for special applications where the timing stability is substantially degraded from $10^{11}$.

Figure 10:
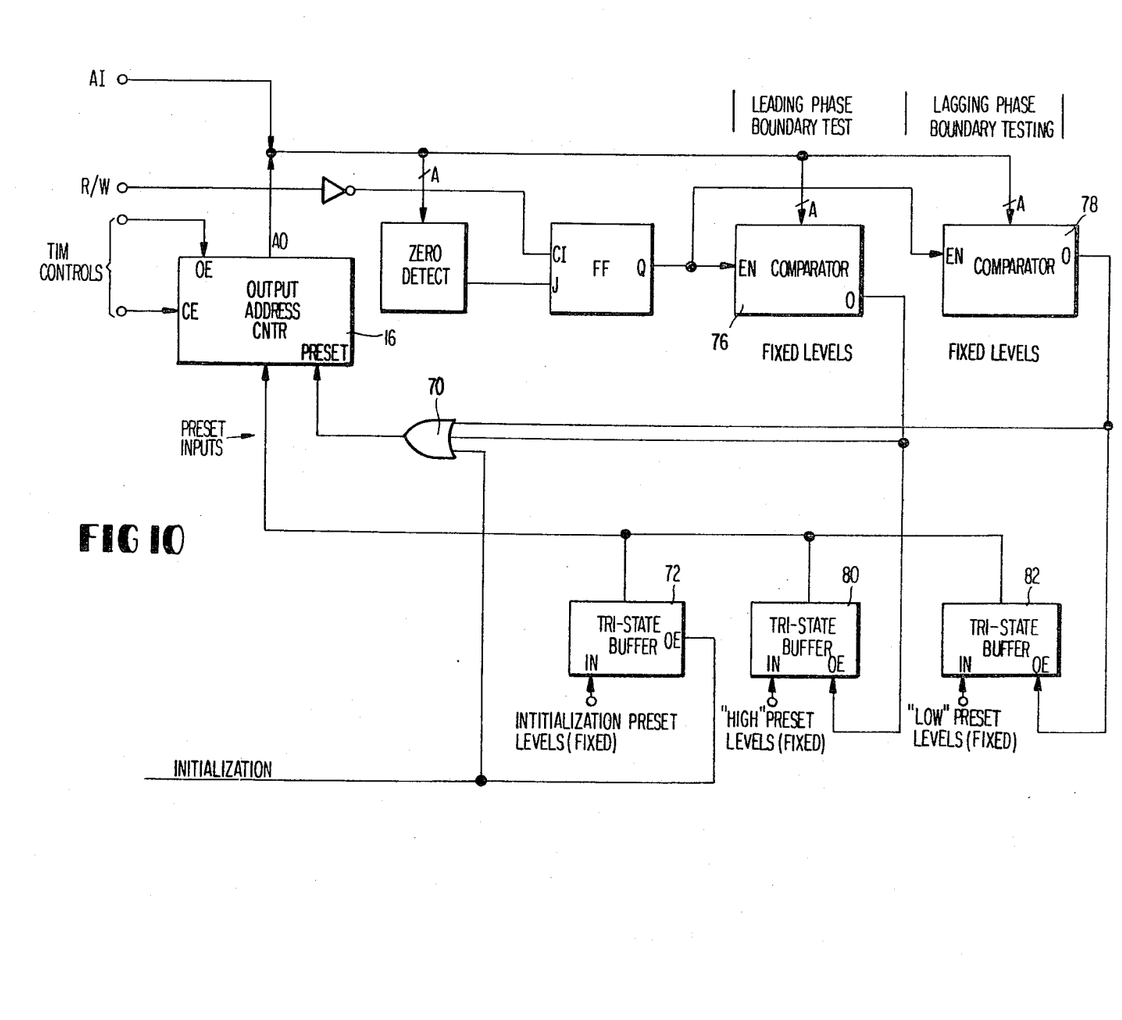
FIG. 10 is a block diagram of the slipping controller of FIG. 1.
Figure 11:
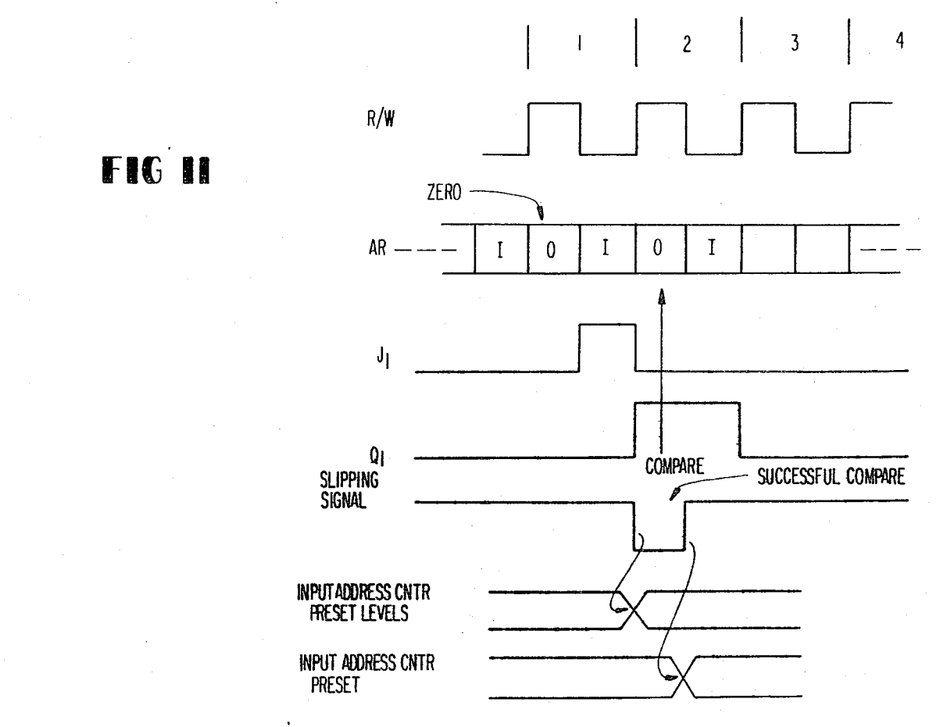
FIG. 11 is an illustration of the operation timing of the slipping control circuitry of FIG. 10.

The slipping controller circuitry will now be described with reference to FIGS. 10 and 11. The circuit which performs slipping control for the receive elastic buffer and a portion of the RAM initialization control is shown in FIG. 10. The transmit side slipping controller is the same as the receive side, and the terrestrial side address counter in both cases is the preset counter on a slipping boundary. As described above in conjunction with FIG. 1, the input counter 20 and output counter 16 are cleared and preset, respectively, in response to an initialization signal received from the TIB. As shown in FIG. 10, the presetting of the output address counter 16 is accomplished by providing the initialization signal to an OR gate 70 and to the output enable (OE) terminal of a tri-state buffer 72. In response to this initialization signal, the address counter 16 is preset to position the read address as shown, for example, by the solid line 74 in FIG. 9. As shown in FIG. 11, a comparison is performed whenever the input address from counter 20 passes "0". When the input counter 20 is at 0, the output counter 16 should be at the solid line position shown at 74 in FIG. 9. The comparators 76 and 78 compare the output address counter value to fixed levels to determine if it is close to zero. If it is too close, the proper comparator will enable one of the buffers 80 or 82 and the read address counter 16 will be preset back to one of the slipping boundaries 62 or 64. For example, if the read address is very close to the write address and is approaching from the clockwise direction, the counter 16 is preset to position the read address back at the boundary position 62. If it is close and approaching from the counterclockwise direction, the counter 16 is preset back to the boundary position 64.

The value of the fixed preset levels in tri-state buffers 80 and 82 is selected such that the terrestrial data stream is advanced or retarded by a fixed number of symbols corresponding to a 2 ms period as derived from the terrestrial clock. The result of this slip at the terrestrial interface is that a 2 ms segment of data is either repeated or deleted according to whether the slip is negative or positive.

What is claimed is:

1. A buffer memory system comprising:
    a Random Access Memory (RAM) having a data input terminal for receiving input data to said RAM, a data output terminal for providing output data from said RAM, an address input terminal for receiving signals indicative of address locations within said RAM and a read/write input terminal for receiving read and write signals, said memory storing said input data at an input address location in response to a write signal and an input address signal and providing output data from an output address location in response to an output address signal and a read signal;
    input address means for providing an input address to said address input terminal in response to an enabling signal;
    output address means for providing an output address to said address input terminal in response to an enabling signal;
    enabling means for providing nonoverlapping enabling signals to said input and output address means to thereby multiplex said input and output address signals onto said address input terminal; and
    read/write means synchronized with said enabling means for providing non-overlapping read and write signals to said read/write terminal.

2. A buffer memory system as defined in claim 1, wherein said read signal is provided only once during every n write signals, where n is a positive integer.

3. A buffer memory system as defined in claim 2, wherein said write signal is provided during each enablement of said input address means.

4. A buffer memory system for asynchronously writing in and reading from the same memory, said system comprising:
    a random access memory (RAM) having a data input terminal for receiving input data, a data output terminal for providing output data, an address input terminal for receiving an address signal which defines an addressed memory location, and a read/write control terminal for receiving read and write signals, said memory storing said input data at an addressed memory location in response to a write signal and providing output data from an addressed memory location in response to a read signal;
    input address means having an enabling terminal for receiving an input enabling signal, said input address means providing an input address to said address input terminal in response to said input enabling signal;
    output address means having an enabling terminal for receiving an output enabling signal, said output address means providing an output address to said address terminal in response to said output enabling signal;
    enabling means for providing non-overlapping enabling signals to said input and output address means to thereby multiplex said input and output address signals onto said address input terminal; and
    read/write means synchronized with said enabling means for providing non-overlapping read and write signals to said read/write terminal.

5. A buffer memory system as defined in claim 4, wherein said read/write means comprises:
    an AND gate having a plurality of input terminals and having an output terminal coupled to the enabling terminal of said input address means; and
    inverter means having its input coupled to the enabling terminal of said output address means and having its output coupled to one input of said AND gate, whereby the provision of an output enabling signal to the enabling terminal of said output address means will disable said AND gate and prevent the simultaneous enabling of said input address means.

6. A buffer memory system as defined in claim 4, further comprising means for providing a first clock signal synchronized to said input data and a second clock signal having a rate less than that of said first clock signal and being synchronized to said first clock signal, wherein said input address means comprises an input address counter for counting said first clock signal and wherein said output address means comprises an output address counter for counting said second clock signal.

7. A buffer memory system as defined in claim 6, wherein said second clock signal is provided to both the enabling terminal of said output address counter and to said read/write control terminal whereby said read signal is provided only when said output address counter is enabled.

8. A buffer memory system as defined in claim 7, further comprising:
   means for providing a latching signal;
   latch means for receiving and storing the output data from said RAM in response to a latching signal;
   means for providing a third clock signal asynchronous to said first clock signal;
   means for receiving said third clock signal and providing a load signal derived from said third clock signal, said load signal being provided between successive latching signals;
   a shift register having a load signal input terminal and a clock signal input terminal for receiving and storing the contents of said latch means in response to said load signal and for reading out said contents in response to a shift register clock signal applied to its clock input terminal; and
   means for providing to said shift register a shift register clock signal derived from said third clock signal.

9. A buffer memory system as defined in claim 8, wherein said shift register clock signal has a rate R and said load and read signals are provided at a rate no greater than R/S, where S is the number of stages in said shift register.

10. A buffer memory system as defined in claim 6, wherein said input address counter includes a clear signal input terminal and is cleared in response to a signal received at said clear signal input terminal, and wherein said output address counter includes a preset value input terminal for receiving a preset value and a preset signal input terminal and is preset to said preset value in response to said preset signal, said buffer memory system further comprising means for providing said clear and preset signals.

11. A buffer memory system as defined in claim 10, further comprising:
   slipping control means for monitoring the contents of said input and output address counters and maintaining a predetermined difference between said input and output addresses.

12. A buffer memory system as defined in claim 11, wherein said slipping control means comprises:
   a first comparator which, in response to a first comparator enabling signal, compares the output of said output address counter to a first predetermined value and provides a first comparison output if the value in said output address counter exceeds said first predetermined value;
   a second comparator which, in response to a second comparator enabling signal, compares the output of said output address counter to a second predetermined value and provides a second comparison output if the value in said output address counter is exceeded by said second predetermined value;
   first preset means which, in response to said first comparison output signal, provides a first preset value to said preset value input terminal;
   second preset means which, in response to said second comparison output signal, provides a second preset value to said preset value input terminal; and
   means for providing said preset signal to said preset signal input terminal in response to an output signal from either of said first or second comparators, whereby said output address is decreased in response to said first comparison output signal and is increased in response to said second comparison output signal.

13. A buffer memory system as defined in claim 6, wherein said means for providing first and second clock signals and said enabling means are included in an interleaving means, said interleaving means comprising:
   a first clock input terminal for receiving a data clock signal synchronized to said input data and having a first pulse rate;
   a second clock input terminal for receiving a read/write control signal which is asynchronous to said data clock signal and has a pulse rate slower than that of said data clock signal;
   a selection terminal for receiving a selection signal;
   a first clock output terminal; and
   a second clock output terminal;
   said interleave circuit providing said data clock signal as said first clock signal at its first clock output terminal when a selection signal is present at said selection terminal, providing said read/write control signal at its second clock output terminal when no selection signal is present at said selection terminal, and providing said second clock signal at said second clock output terminal when a selection signal is present at said selection terminal, said second clock signal being synchronized with said first clock signal and having the same rate as said read/write control signal, said first clock output terminal being coupled to the clock input terminal of said input address counter and said second clock output terminal being coupled to the clock input terminal of said output address counter.

14. A buffer memory system as defined in claim 13, wherein said interleave circuit includes an AND gate having a first input for receiving said data clock signal and a second input for receiving said selection signal, the output of said AND gate being coupled to said first clock output terminal.

15. A buffer memory system as defined in claim 14, wherein said interleave circuit further comprises:
   a first flip-flop having a clock terminal, an input terminal, a reset terminal and an output terminal, said flip-flop clock terminal receiving the output from said AND gate and said flip-flop input terminal and reset terminal receiving said read/write control signal;
   an inverter having its input coupled to the output of said AND gate;

a second flip-flop having an input terminal coupled to the output terminal of said first flip-flop, a clock terminal receiving the output from said inverter, a reset terminal for receiving said read/write control signal, and providing an output at its output terminal.

a second AND gate receiving the outputs of said first and second flip-flops and providing at its output said second clock signal.

16. A buffer memory system as defined in claim 15, wherein said interleave circuit further comprises:

a second inverter having its input coupled to said selection terminal and providing an output;

a third AND gate having a first input terminal coupled to the output of said second inverter and having a second input terminal receiving said read/write control signal;

a fourth AND gate having a first input coupled to said selection terminal and a second input coupled to the output of said second AND gate; and an OR gate receiving as inputs the outputs of said third and fourth AND gates and having its output coupled to said second clock output terminal.

17. A buffer memory system as defined in claims 15 or 16, wherein the pulses occurring in said second clock signal are synchronized with one half cycle of said first clock signal.

18. A buffer memory system as defined in claim 4, further comprising latch means for receiving and storing the output data from said RAM in response to a latching signal, and means for providing said latching signal between successive read signals.

19. A buffer memory system as defined in claim 18, wherein said latching signal is provided by the output of an inverter having its input coupled to said read/write control terminal, whereby said latching signal is provided at the end of said write signal.

* * * * *

UNITED STATES PATENT AND TRADEMARK OFFICE
CERTIFICATE OF CORRECTION

PATENT NO. : 4,287,577             Page 1 of 2

DATED : September 1, 1981

INVENTOR(S) : Joseph H. Deal

It is certified that error appears in the above—identified patent and that said Letters Patent is hereby corrected as shown below:

Col. 1 - line 18, change "accomodate" to --accommodate-- line 19, change "proove" to --prove--

Col. 3 - line 35, change "Q" (second occurrence) to --$\overline{Q}$--

Col. 5 - line 24, change "accomodate" to --accommodate--

Table I - change "(+ 40 ms)" to --(+ 4 ms)--

Col. 5 - line 49, change "accomodate" to --accommodate-- line 51, change "accomodate" to --accommodate-- line 61, change "fpr" to --for-- line 61, change "accomodating" to --accommodating-- line 64, change "accomodates" to --accommodates-- line 66, change "accomodates" to --accommodates--

Col. 6 - line 56, change "accomodates" to --accommodates-- line 63, change "accomodates" to --accommodates--

Col. 7 - line 9, change "accomodates" to --accommodates--

UNITED STATES PATENT AND TRADEMARK OFFICE
CERTIFICATE OF CORRECTION

PATENT NO. : 4,287,577

DATED : September 1, 1981

INVENTOR(S) : Joseph H. Deal

It is certified that error appears in the above—identified patent and that said Letters Patent is hereby corrected as shown below:

Claim 1, Col. 8, line 14 - change "nonoverlapping" to --non-overlapping--

Claim 15, Col. 11, line 7, change " . " to -- ; --

Signed and Sealed this

Twenty-ninth Day of December 1981

[SEAL]

Attest:

GERALD J. MOSSINGHOFF

Attesting Officer

Commissioner of Patents and Trademarks